Nov. 21, 1961 F. A. SATTLER ET AL 3,009,896
PROCESS FOR PREPARING A DIALKYL TEREPHTHALATE-POLYHYDRIC ALCOHOL
POLYESTER IN THE PRESENCE OF LEAD ACETATE, COATING COMPOSITION
CONTAINING SAID POLYESTER, AND ELECTRICAL CONDUCTOR
COATED WITH THE HEAT-CURED PRODUCT THEREOF
Filed April 24, 1957

Fig. 1.

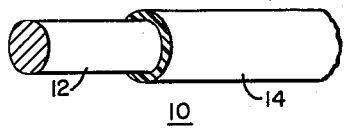

Fig. 2.

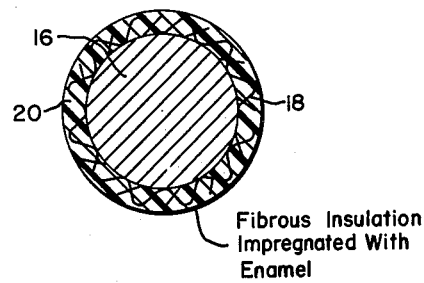

Fibrous Insulation
Impregnated With
Enamel

WITNESSES:
Bernard R. Giegue
Robert C. Baird

INVENTORS
Frank A. Sattler,
and Dow A. Rogers, Jr.
BY William J. Addison
ATTORNEY United States Patent Office 3,009,896
Patented Nov. 21, 1961

3,009,896
PROCESS FOR PREPARING A DIALKYL TEREPH-
THALATE-POLYHYDRIC ALCOHOL POLYESTER
IN THE PRESENCE OF LEAD ACETATE,
COATING COMPOSITION CONTAINING SAID
POLYESTER, AND ELECTRICAL CONDUCTOR
COATED WITH THE HEAT-CURED PRODUCT
THEREOF
Frank A. Sattler, Wilkinsburg, and Dow A. Rogers, Jr.,
Wilkins Township, Allegheny County, Pa., assignors to
Westinghouse Electric Corporation, East Pittsburgh,
Pa., a corporation of Pennsylvania
Filed Apr. 24, 1957, Ser. No. 654,946
6 Claims. (Cl. 260—33.4)

The present invention relates to coating compositions and has particular reference to polyester coating resins and insulated products produced therewith.

Enamel coatings on wire must be tough and hard to withstand the severe mechanical abuse to which the wire is subjected in service. Thus, coils frequently are wound from enameled wire under considerable pressure and at high speeds. The enamel must withstand the abrasion, bending stresses and heavy pressures encountered during such winding without breaking, cracking or otherwise disrupting from the wire.

After coils are wound, they usually are dipped in hot varnishes containing one or more of a variety of organic solvents and then baked at temperatures as high as 250° C. To be completely satisfactory, the enameled coating must be thermally stable and resistant to the action of varnishes, solvents, oils, grease, water, grit and dust that may be encountered in service.

Wire enamel solutions should be capable of being stored for long periods of time without increasing substantially in viscosity. Moreover, the enamel solutions should be capable of being applied to wire at relatively fast coating speeds and, when applied, should be capable of being baked or heat treated over a relatively wide range of temperatures to effect curing of the enamel on the wire. The applied cured coating of resins should be smooth and free from pin holes or other flaws. Furthermore, a thin coating of the cured enamel should possess a high dielectric strength and have other desirable electrical insulating properties.

It has been determined that enameling solutions containing polyester coating resins prepared from aromatic dicarboxylic acids exhibit extremely high temperature stability characteristics. Such coating resins are characterized by high molecular weights and, in general, function more satisfactorily as wire enamel compositions than do polyester resins prepared from certain aliphatic dicarboxylic acids.

Heretofore, it has been difficult to prepare satisfactory polyester resins from certain aromatic dicarboxylic acids such as dialkyl esters of terephthalic acid. To effect esterification or condensation of such aromatic dicarboxylic acids with polyhydric alcohols, the acidic compounds and alcohols must be heated to temperatures within the range of from about 240° C. to 260° C. or even up to about 300° C. Most commercially available polyhydric alcohols have boiling points below this temperature range. Therefore, esterification or condensation of aromatic dicarboxylic acids with such polyhydric alcohols is difficult since the alcohols frequently vaporize before esterification is achieved.

Heretofore, certain catalytic materials have been used which promote the condensation or esterification of certain aromatic dicarboxylic acids such as dialkylesters of terephthalic acid and polyhydric alcohols at temperatures below about 240° to 260° range. However, the presence of such catalysts, even in trace amounts, in the finished polyester frequently promotes decomposition or degradation of the polyester resins at the temperatures of esterification or at the temperatures to which the enameling solution is heated to cure the enamel on the wire.

It now has been discovered that the esterification of certain of these aromatic dicarboxylic acids now may be effected satisfactorily by employing metal salts of organic acids as the esterification catalyst. Surprisingly, wire enamels containing polyesters prepared using these catalysts do not decompose on curing and, in fact, have better heat stability characteristics than other prior known enamels.

The object of the present invention is to provide a process for esterifying certain aromatic dicarboxylic acids and polyhydric alcohols in the presence of critical amounts of catalysts comprising metallic salts of certain organic acids.

Another object of the present invention is to provide conductors insulated with an enamel containing a polyester resin derived by esterifying aromatic dicarboxylic acids with polyhydric alcohols in the presence of critical amounts of metallic salts of certain organic acids.

Other objects of the invention will, in part, be obvious and will, in part, appear hereinafter.

For a more complete understanding of the present invention, reference is made to the following description taken in conjunction with the accompanying drawing wherein:

FIGURE 1 is a fragmentary front view of a conductor provided with an enameled coating; and FIG. 2 is a cross-sectional view of a conductor insulated with fibrous material and an enamel of this invention.

In the attainment of the foregoing objects and in accordance with the present invention, it now has been discovered that aromatic dicarboxylic acids may be esterified or condensed with polyhydric alcohols, at lower temperatures than was heretofore possible, by carrying out the reaction in the presence of critical amounts of catalysts comprising metal salts of certain organic acids. The polyesters obtainable upon such esterification or condensation, when dissolved in suitable solvents, provide liquid enameling compositions having the properties required of the highest grade insulating enamels. The catalysts need not be removed from the finished polyester, since such catalysts, even when present in relatively large amounts in an enameling composition, do not promote degradation or decomposition of the polyester resin. It has been determined that enamels formulated with polyesters prepared as herein described have extremely high thermal stability characteristics.

The polyester resins of this invention are prepared by reacting about one mol of the aromatic dicarboxylic acid component with from about 0.667 to 2 mols of at least one polyhydric alcohol in the presence of from 0.005 percent to 2 percent by weight, based on the total weight of the reactants, of at least one metal salt of an organic acid.

The invention is applicable particularly to the esterification of dialkyl esters of terephthalic acid with polyhydric alcohols since, as described hereinabove, the esterification of these reactants is particularly difficult to carry out. While other aromatic dicarboxylic acids such as phthalic acid, isophthalic acid, and dialkyl esters thereof may be esterified without using the catalysts herein described, the use of the catalysts does materially increase the rate at which the esterification of these other acids proceeds.

The dialkyl esters of terephthalic acid which are suitable for use in accordance with this invention include those esters in which the dialkyl groups contain from 1 to 4 carbon atoms per molecule, for example, methyl, ethyl, butyl, isobutyl, propyl, isopropyl, and the like. The esters may be used singly or in admixtures of two or more.

Polyhydric alcohols which are suitable for use in forming the polyesters of this invention, comprise aliphatic polyhydric alcohols having from 2 to 8 carbon atoms per molecule. Examples of suitable alcohols include glycerol, pentaerythritol, 1,1,1-trimethylolpropane, 1,1,1-trimethylolethane, 1,4-butanediol, 1,6-hexanediol, ethylene glycol, propylene glycol and the like. The aliphatic alcohols may be replaced in amounts up to about 10% by weight by high boiling polyhydric alcohols, such as 2,2 - bis - (parahydroxyethoxyphenyl) propane, 2,2-bis-(para-hydroxyethoxyethoxyphenyl) propane, 2,2 - bis - (para-hydroxypropoxyphenyl) propane, 2,2 - bis-(para-hydroxypropoxypropoxyphenyl) propane, 2,2-bis-(para-hydroxyethoxybiphenyl) propane, and the like diphenylols also may be used. The alcohols may be employed singly or in combinations of two or more.

The catalysts of this invention comprise metal salts of organic acids selected from the group consisting of saturated and unsaturated aliphatic acids, cyclic acids, and aromatic acids. Examples of suitable catalysts include linolates, resinates, naphthenates, acetates, aromatic benzoates, octoates, tallates, stearates, and the like of metals including aluminum, calcium, cesium, chromium, cobalt, copper, iron, lead, manganese, nickel, tin, titanium, vanadium, zinc and zirconium. Two or more metal salts may be employed jointly as a catalyst.

The resinous polyesters of this invention may be prepared in accordance with usual esterification procedures as, for example, by heating a mixture of the acidic components, polyhydric alcohols and catalysts at a temperature of from 150° C. to 250° C. In many cases, more complete esterification is obtained when the relatively low boiling alcohol formed during the esterification reaction is removed by carrying out the esterification in the presence of an organic liquid such as m,p-cresol or the like, and by passing an inert gas such as nitrogen or carbon dioxide through the reaction mixture.

Wire enamels may be prepared utilizing the herein described polyesters by forming a solution comprising (A) from 40 to 10 parts by weight of the herein described polyester and (B) from 60 to 90 parts by weight of a solvent comprising a mixture of cresols and hydrocarbons having a boiling point range of from about 135° C. to 250° C. together with certain monohydric alcohols. More specifically, mixtures of solvents comprising from 40 to 50 percent by weight of a phenol such as cresol or xylenol, or mixtures thereof, such as a mixture of phenol and cresol in equal parts, may be combined with one or more of the following: ethanol, isopropanol, monochlorobenzene, xylol, toluol, and petroleum hydrocarbon distillates having boiling points within the range of from 130° C. to 200° C. Solutions of the polyester resin in such solvents may be employed in coating wire either by dip coating, die-coating, or like techniques. Furthermore, coils and other electrical members may be dipped or impregnated in these compositions.

In order to illustrate the invention even more fully, the following specific examples are set forth. The parts given are by weight unless otherwise indicated.

*Example I*

Two mols of dimethyl terephthalate, 2 mols of glycerol, 0.01 mol of lead acetate, and 100 milliliters of m,p-cresol are charged into a reaction vessel. A stream of nitrogen gas is passed through the reactants. The reactants are heated for seven hours at 220° C. until a resinous composition is obtained having a ball and ring softening temperature of 77° C. Thereafter, another 100 milliliters of cresol were added to the resin and heating was continued for an additional hour until the resulting mixture had a ball and ring softening temperature of 56° C. The polyester resin thus prepared was formulated into a wire enamel composition by dissolving about 15 parts of the polyester in about 85 parts of a mixture of solvents including 400 parts of cresol and 300 parts of xylene. This wire enamel was coated on No. 17 A.W.G. copper wire at the rate of 9 feet per minute at 500° C., 14 feet per minute at 500° C., and 14 feet per minute at 475° C. in a tower 8 feet high. Twisted samples of wire coated at these various coating rates and temperatures were tested for thermal stability according to American Institute of Electrical Engineering Test No. 57 at 200° C. The thermal life of this enamel as determined from an average of 10 samples tested was 3,300 hours at 200° C. The enamel had a scrape hardness of 33–45 ounces using a 9 mil diameter knife edge, an abrasion test of 57–75 average strokes for 6 samples tested and a dielectric strength of 7,500–12,000.

*Example II*

Two mols of dimethyl terephthalate, 1 mol of glycerol, 1.5 mols of ethylene glycol and 0.01 mol of cobalt naphthenate were charged into a reaction vessel. The reactants were heated, while a stream of nitrogen was passed therethrough, over a temperature range of from 170° C. to 250° C. for a period of seven hours to a ball and ring softening temperature of 104° C. Thereafter, 100 milliliters of cresol was added and the resulting mixture was heated for one hour at 220° C. at which time the resulting polyester had a ball and ring softening temperature of 78° C. Still another 100 milliliters of cresol was added and the polyester was heated at 210° C. for 1.5 hours after which a sample thereof had a ball and ring softening temperature of 52° C. A wire enamel was prepared by dissolving about 25 parts of the resulting polyester in about 75 parts of a mixture of solvents containing 400 parts of cresol and 300 parts of xylene. This wire enamel was coated on No. 17 A.W.G. copper wire at a rate of 9 feet per minute at 500° C. and at a rate of 17 feet per minute at 500° C. Twisted samples of wire coated at these coating rates and temperatures were tested for thermal stabiltiy, as determined by A.I.E.E. Test No. 57 at 200° C. The thermal life of this enamel, as determined from an average of 10 samples tested, was 2,500 hours at 200° C. The enameled wire had a scrape hardness of 32–35 ounces using a 9 mil diameter knife edge, an abrasion test of 36–54 average strokes, and a dielectric strength of 9,000–11,000. Other sizes of wire up to No. 40 were coated with this enamel. Each size of enameled wire so produced had extremely high physical properties, such as high scrape test values, and fully met all of the known tests used in establishing the quality of a satisfactory enameled wire.

*Example III*

A polyester is prepared according to the procedure described in Example II using the following ingredients:

2 mols dimethyl terephthalate
1 mol glycerol
0.75 mol ethylene glycol
0.75 mol 1,4-butanediol
3.5 grams cobalt tallate (6% cobalt)
0.5 gram lead acetate This polyester, when formulated into a wire enamel as described in Example II, readily may be coated on copper or aluminum wire to provide a high temperature insulating coating therefor having excellent mechanical characteristics.

Referring to the drawing, there is illustrated a conductor 10 comprising a copper conductor 12 coated with a hard, tough, solid, resinous enamel 14 produced by applying a specific solvent solution of the polyester resin of this invention thereto and curing by heat treatment.

It will be understood that the coating 14 may be applied by any suitable means, such as by dipping, die-coating, or the like. Conductor 10, while described as being copper, may be an alloy thereof or aluminum, silver, alloys thereof or the like. After curing by heating, coating 14 adheres tenaciously to the copper conductor 12. While the conductor 12 is illustrated as being circular in cross section, it will be understood that it may be of any other desirable cross section such as rectangular, square, or flat strip or the like. Fillers may be included in the coating 14. Examples of suitable fillers include finely divided silica, mica, iron oxide, hydrated alumina, titanium dioxide, or the like as well as coloring materials.

The enamels of the present invention also may be applied to electrical conductors such as wire in combination with coatings of both organic and inorganic fibrous materials. One form of such a modification is illustrated in FIG. 2. A copper wire 16 is provided with an exterior coating 18 of fibrous material, which may be glass fibers, asbestos fibers, paper, cotton, silk or the like either wrapped or braided or woven, or various combinations thereof. A quantity of the enamel 20 of this invention is impregnated into the fibrous coating 18 and baked to provide a composite insulation about copper wire 16.

While the invention has been described with respect to what is at present considered to be preferred embodiments thereof, it will be understood, of course, that certain modifications, changes, substitutions and the like may be made therein without departing from its true scope.

We claim as our invention:

1. A process for preparing a polyester which comprises heating at a temperature of from about 150° C. to about 250° C. one mol of at least one dialkyl ester of terephthalic acid with from 0.667 to 2 mols of at least one polyhydric alcohol a substantial proportion of which is an alcohol having at least 3 reactive hydroxyl groups in the presence of from 0.005 percent to 2 percent by weight based on the total weight of the reactants of lead acetate.

2. A process for preparing a polyester which comprises heating at a temperature of from about 150° C. to about 250° C. one mol of dimethyl terephthalate with from 0.667 to 2 mols of at least one polyhydric alcohol a substantial proportion of which is an alcohol having at least 3 reactive hydroxyl groups in the presence of from 0.005 percent to 2 percent by weight based on the total weight of the reactant, of lead acetate.

3. A process for preparing a liquid wire enamel which comprises heating at a temperature of from 150 to 225° C. one mol of at least one dialkyl ester of terephthalic acid with from 0.667 to 2 mols of at least one polyhydric alcohol a substantial proportion of which is an alcohol having at least 3 reactive hydroxyl groups in the presence of from 0.005 percent to 2 percent by weight based on the total weight of the reactants of lead acetate, and dissolving said polyester in an organic solvent comprising a mixture of cresols and hydrocarbons having a boiling point range of from 135° to 250° C.

4. A polyester coating composition comprising (A) from 40 to 10 parts by weight of a polyester derived by reacting and heating at a temperature of from 150° to 225° C. one mol of at least one dialkyl ester of terephthalic acid with from 0.667 to 2 mols of at least one aliphatic polyhydric alcohol having from 2 to 8 carbon atoms per molecule and a substantial proportion of an alcohol having at least 3 reactive hydroxyl groups in the presence of from 0.005 percent to 2 percent by weight, based on the total weight of the esterification reactants, of lead acetate, and (B) from 60 to 90 parts by weight of a solvent mixture comprising a mixture of cresols and hydrocarbons having a boiling point range of from 135° to 250° C.

5. A polyester coating composition comprising (A) from 40 to 10 parts by weight of a polyester derived by reacting and heating at a temperature of from 150° to 225° C. one mol of a dimethyl terephthalate with from 0.667 to 2 mols of at least one aliphatic polyhydric alcohol having from 2 to 8 carbon atoms per molecule and a substantial proportion of an alcohol having at least 3 reactive hydroxyl groups in the presence of from 0.005 percent to 2 percent by weight, based on the total weight of the esterification reactants, of lead acetate and (B) from 60 to 90 parts by weight of a solvent mixture comprising a mixture of cresols and hydrocarbons having a boiling point range of from 135° to 250° C.

6. An electrical conductor comprising a conducting member having a coating of insulation applied thereto, the insulation comprising the heat-cured product of a composition comprising (A) from 40 to 10 parts by weight of a polyester derived by reacting and heating at a temperature of from 150° to 225° C. one mol of at least one dialkyl ester of terephthalate acid with from 0.667 to 2 mols of at least one aliphatic polyhydric alcohol having from 2 to 8 carbon atoms per molecule and a substantial proportion of an alcohol having at least 3 reactive hydroxyl groups in the presence of from 0.005 percent to 2 percent by weight, based on the total weight of the eserification reactants, of lead acetate, (B) from 60 to 90 parts by weight of a solvent mixture comprising a mixture of cresols and hydrocarbons having a boiling point range of from 135° to 250° C.

References Cited in the file of this patent

UNITED STATES PATENTS

| | | |
|---|---|---|
| 2,305,224 | Patterson | Dec. 15, 1942 |
| 2,497,376 | Swallow et al. | Feb. 14, 1950 |
| 2,641,592 | Hofrichter | June 9, 1953 |
| 2,683,100 | Edgar et al. | July 6, 1954 |
| 2,727,881 | Caldwell et al. | Dec. 20, 1955 |
| 2,863,855 | Wilson | Dec. 9, 1958 |
| 2,936,296 | Precopio et al. | May 10, 1960 |